(12) United States Patent
Jensen et al.

(10) Patent No.: US 6,402,453 B1
(45) Date of Patent: Jun. 11, 2002

(54) SIDE DUMP BODY INCLUDING A MATERIAL COMPACTION ASSEMBLY

(75) Inventors: Layton W. Jensen, Thurston, NE (US); Ralph R. Rogers, Dakota Dunes, SD (US)

(73) Assignee: Thurston Mfg. Co., Thurston, NE (US)

( * ) Notice: Subject to any disclaimer, the term of this patent is extended or adjusted under 35 U.S.C. 154(b) by 0 days.

(21) Appl. No.: 09/550,095

(22) Filed: Apr. 14, 2000

(51) Int. Cl.[7] .......................... B60P 1/64; B65G 67/32
(52) U.S. Cl. ..................... 414/501; 414/471; 298/18
(58) Field of Search .................... 414/471, 501, 414/492, 719, 525.2, 525.6; 298/17.7, 17.8, 18

(56) References Cited

U.S. PATENT DOCUMENTS

| | | | | |
|---|---|---|---|---|
| 4,005,789 A | * | 2/1977 | Gladwyn et al. | 214/82 X |
| 4,113,120 A | * | 9/1978 | Pickrell | 214/38 X |
| 5,501,567 A | * | 3/1996 | Lanzdorf et al. | 414/408 X |
| 5,560,289 A | * | 10/1996 | Pernsteiner | 100/34 X |

* cited by examiner

Primary Examiner—Christopher P. Ellis
Assistant Examiner—Kenneth W Bower
(74) Attorney, Agent, or Firm—Thomte, Mazour & Niebergall; Dennis L. Thomte (57) ABSTRACT

A side dump body including a plurality of side dump body units pivotally mounted on a truck or trailer frame. Each of the side dump body units may be individually pivotally moved from a transport position to a dumping position wherein the contents of the dump body units may be dumped from the side of a truck or trailer. A material compactor is provided at the upper end of each of the body units for compacting material within the body unit. The material compactor may be moved from its operative compaction position wherein it overlies the upper end of the body unit to an inoperative position at one side of the body unit so that the body unit may be moved to its dumping position without interference from the material compactor.

26 Claims, 10 Drawing Sheets

SIDE DUMP BODY INCLUDING A MATERIAL COMPACTION ASSEMBLY

BACKGROUND OF THE INVENTION

1. Field of the Invention

This invention relates to a side dump body and more particularly to a side dump body for use on a trailer or truck. More specifically, the invention relates to a side dump body which has increased carrying capacity when compared to conventional side dump trailers and which has a material compaction assembly associated therewith. The material compaction assembly of this invention may also be used on bottom dump bodies, walking floor bodies or live floor bodies.

2. Description of the Related Art

Dump bodies which are employed on trailers or trucks normally are of the end dump type or the side dump type. Since the introduction of the side dump body disclosed in U.S. Pat. No. 5,480,214, side dump trucks and trailers have experienced wide acceptance. Perhaps the only drawback to the side dump body of U.S. Pat. No. 5,480,214 is that the body does not have as much carrying capacity as an end dump body due to the fact that the side walls of the side dump body extend upwardly and outwardly from a bottom wall, rather than extending vertically upwardly from a bottom wall as in most conventional end dump bodies.

Although the side dump bodies have met with considerable success, the side dump bodies of the prior art are not believed to have any capability of compacting the material within the body or container. If the material compaction assembly is associated with the side dump body, the side dump body has another use, that is, for the collection of refuse or the like.

SUMMARY OF THE INVENTION

A leak-proof side dump body is disclosed which has substantially vertically disposed side walls to increase the carrying capacity of the body as compared to those side dump bodies having upwardly and outwardly extending side walls. A plurality of horizontally spaced-apart supports are secured to the frame means of the truck or trailer. A side dump body is positioned between each pair of the supports and is pivotally secured thereto so that the dump body may be moved from a transport position to a dumping position.

A material compaction assembly is movably supported on the frame of the truck or trailer and is movable from a compaction position over the upper end of the dump body to an inoperative position at one side of the dump body. When the material compaction assembly is in its inoperative position, the side dump body may be pivotally moved to its dumping position without interference from the material compaction assembly. The material compaction assembly comprises a hood or housing having a support frame provided in the interior thereof. A compaction member is movably supported on the support frame in the hood of the material compaction assembly and is movable from a position within the hood downwardly into the side dump body to compact the material therein.

The inoperative position of the material compaction assembly also provides a counterbalance during the dump cycle.

It is therefore a principal object of the invention to provide an improved side dump body for use on a truck or trailer which has a material compaction assembly mounted thereon.

Still another object of the invention is to provide a side dump body having an increased carrying capacity when compared to conventional side dump bodies and which has a material compaction assembly mounted thereon.

Still another object of the invention is to provide a material compaction assembly for a side dump body which may by moved from an operative position at the upper end of the body to an inoperative position adjacent the body so that the body may be pivotally moved to its dumping position without interference from the material compaction assembly.

Still another object of the invention is to provide a side dump trailer or truck wherein a plurality of side dump bodies having material compaction assemblies mounted thereon are individually selectively pivotally secured to the frame means of the truck or trailer.

Yet another object of the invention is to provide a material compaction assembly for a side dump body wherein the compaction assembly provides a counterbalance, when in its inoperative position, during the dump cycle.

Yet another object of the invention is to provide a material compaction assembly for a side dump body which secures the load during transport.

Yet another object of the invention is to provide a material compaction assembly for a side dump body which is leak-proof.

These and other objects will be apparent to those skilled in the art.

DESCRIPTION OF THE PREFERRED EMBODIMENT

The side dump body apparatus of this invention is referred to generally by the reference numeral 10 and comprises one or more side dump units 12 mounted on a frame means 14 which may be incorporated into a trailer or into what is commonly called a straight truck. Although the drawings illustrate the side dump body 10 being mounted on a trailer, the side dump body could also be mounted on a truck as described.

Although the drawings illustrate a plurality of the side dump units 12 being mounted on a trailer, a single side dump unit 12 may be utilized if desired. Inasmuch as all of the side dump units 12 are identical, only a single side dump unit 12 will be described in detail.

Side dump unit 12 includes a body or tub 18 including a bottom wall 20, front wall 22, back wall 24 and opposite side walls 26 and 28. Front wall 22, back wall 24 and side walls 26 and 28 define an open upper end 30.

Supports 32 and 32' are secured to the frame means of the trailer in a spacedapart relationship and are positioned rearwardly of the back wall 24 of the body 18 and are positioned forwardly of the front wall 22 of the body 18, respectively. Inasmuch as each of the supports 32 and 32' are identical, only support 32 will be described in detail. Support 32 includes a base 32A and spaced-apart side walls 32B and 32C. Side walls 32B and 32C are provided with upwardly extending projections 34B and 34C at one side thereof which are pivotally secured to the back or front wall by means of pin 36. Hydraulic cylinder 38 is pivotally connected at its base end to side walls 32B and 32C of support 32 at 39 and has its rod end pivotally connected to the back or front wall of the body 18 at 40. Thus, extension of the hydraulic cylinders 38 on the supports 32 and 32' will cause the body 18 to be pivotally moved from its transport position to its dumping position and vice versa.

Figure 8:
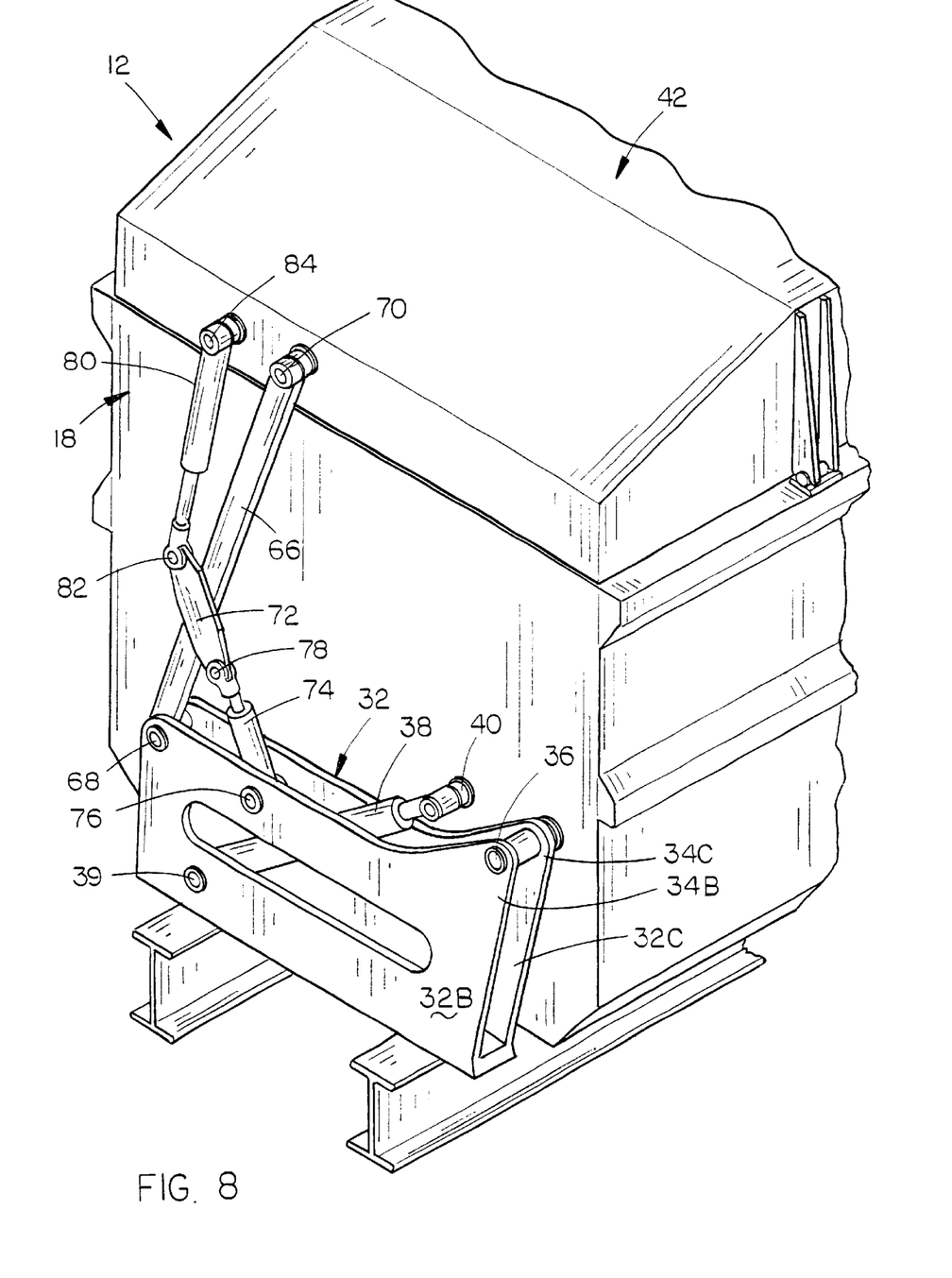
FIG. 8 is a partial rear perspective view of the invention.
Figure 9:
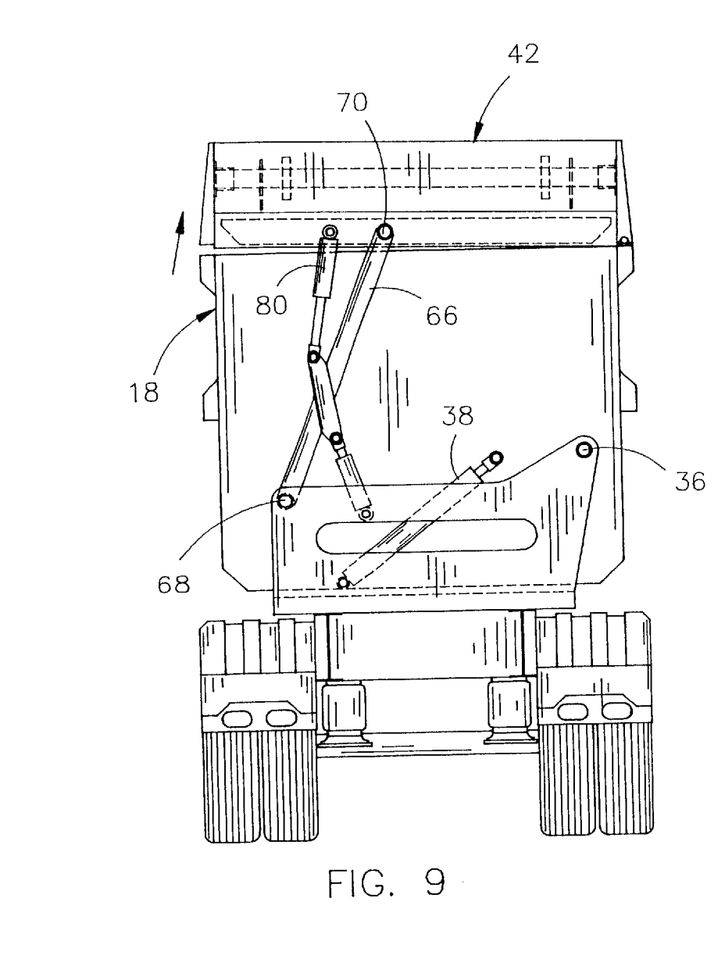
FIG. 9 is a rear elevational view illustrating the side dump body in its transport position and the compaction assembly in its operative position.
Figure 10:
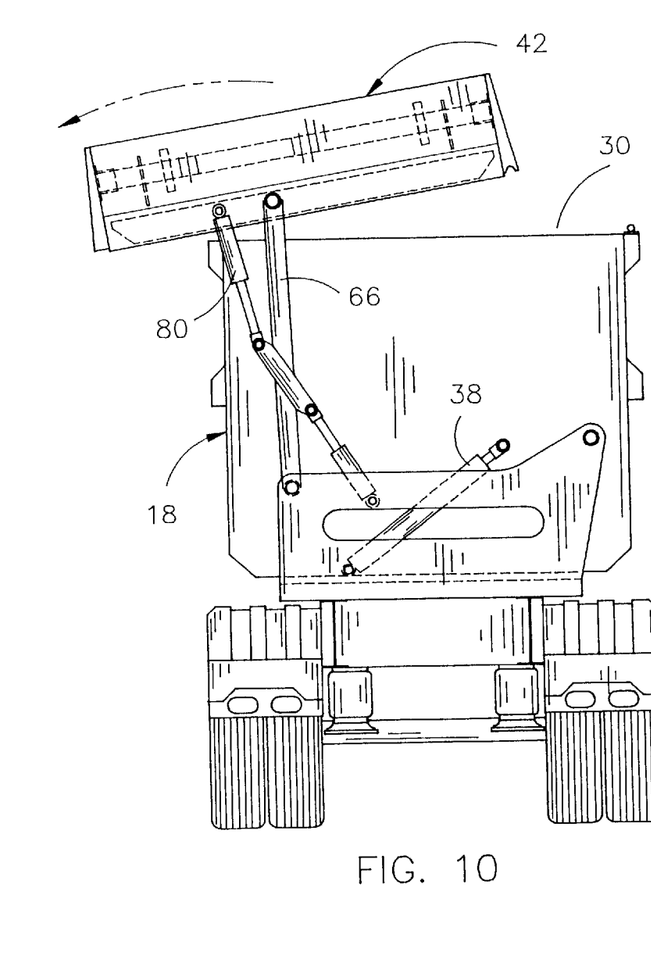
FIG. 10 is a view similar to FIG. 9 except that the material compaction assembly is being moved from its operative position towards an inoperative position.

The numeral 42 refers to a material compaction assembly which is operatively pivotally secured to the frame of the trailer and which may be positioned in its operative position, illustrated in FIG. 8, wherein it is positioned over the open upper end of the body 18 to an inoperative position at one side of the body 18 (FIG. 11), as will be described in more detail hereinafter.

Figure 1:
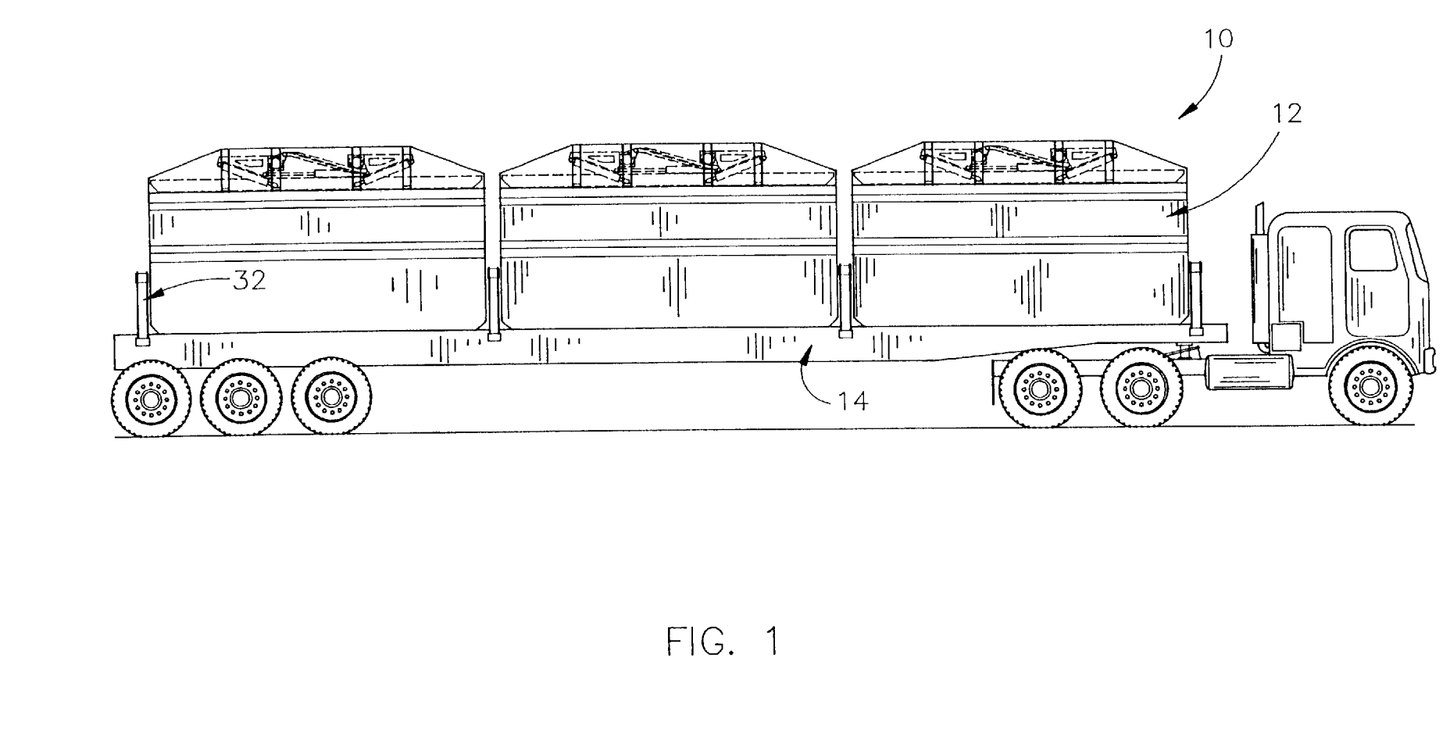
FIG. 1 is a side elevational view of the invention.
Figure 2:
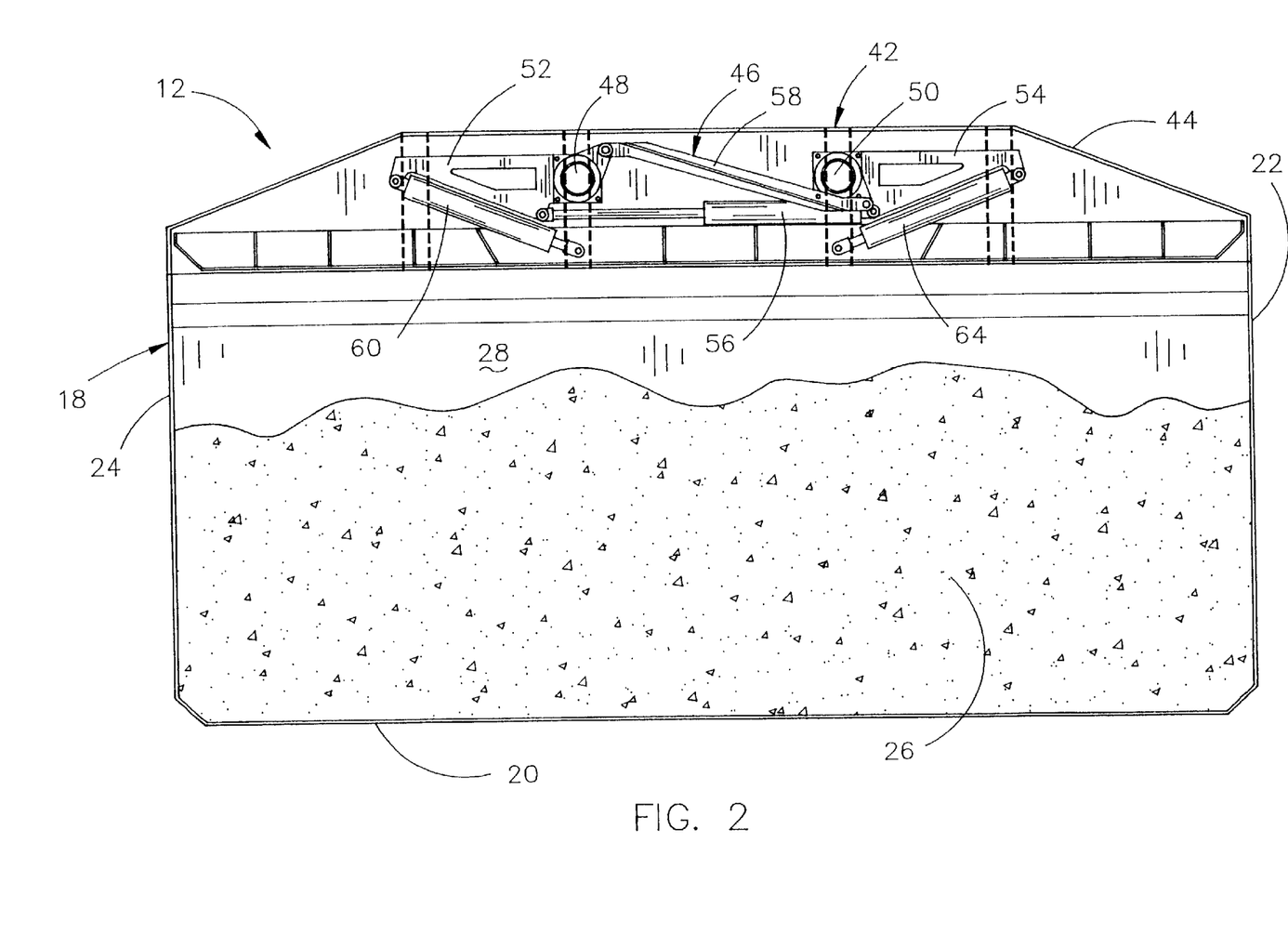
FIG. 2 is a partial side elevational view of one of the dump bodies with portions thereof cut away to more fully illustrate the invention.
Figure 3:
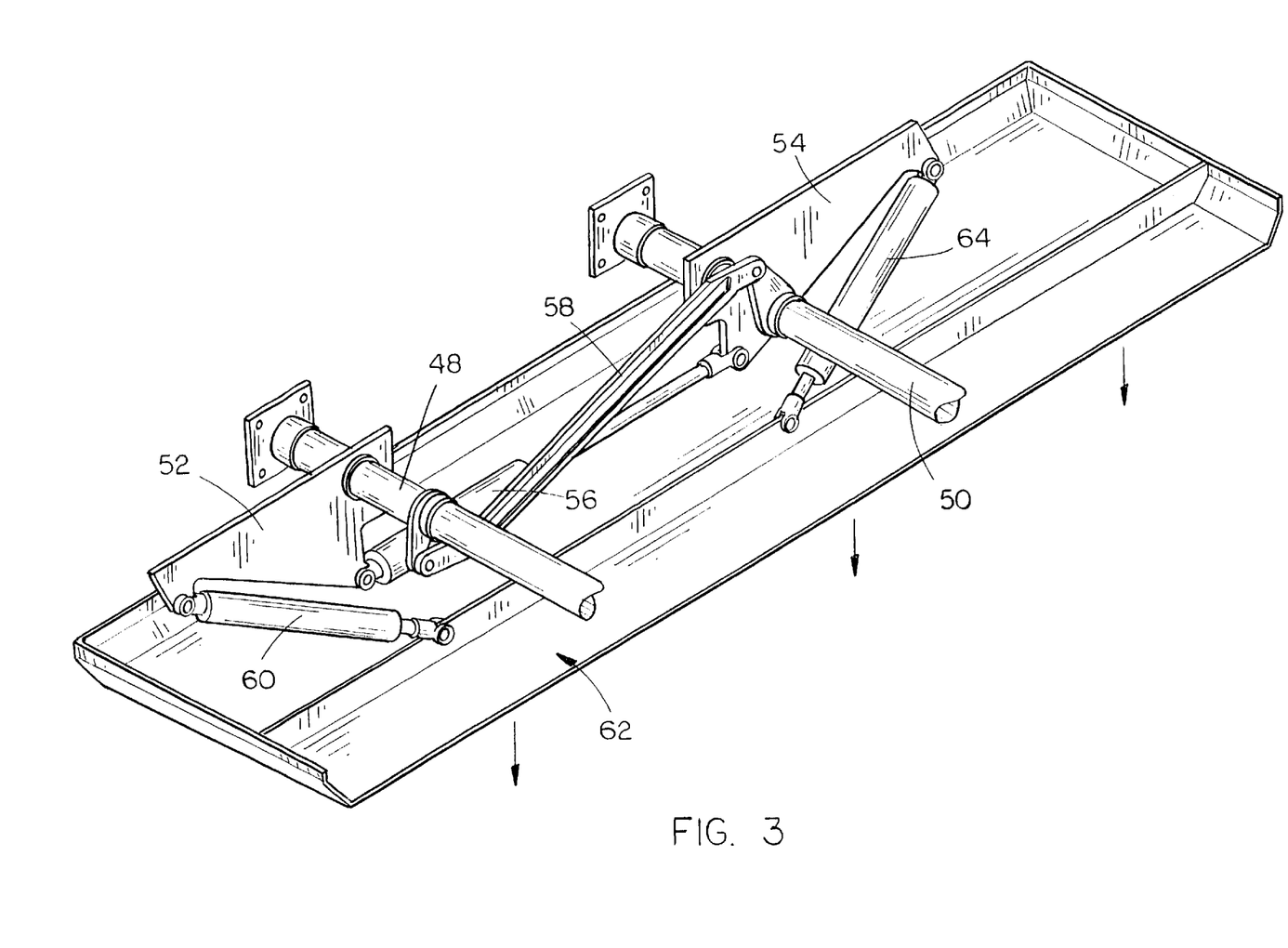
FIG. 3 is a partial perspective view of the material compaction assembly.

Compaction assembly 42 includes a hood or housing 44 having a configuration such that it will close the upper end of the body 18 when it is in its operative or compaction position. A support framework 46 is provided in the interior of the hood 44 and includes a pair of horizontally disposed jack shafts 48 and 50 which are rotatable about a horizontal axis with respect to the framework 46. Arm 52 has one end secured to the jack shaft 48 for rotation therewith, as seen in the drawings. Arm 54 has one end thereof secured to jack shaft 50 for rotation therewith, as also seen in the drawings. Hydraulic cylinder 56 has its rod end pivotally connected to arm 52 and has its base end pivotally connected to arm 54, as seen in FIG. 2. Link arm 58 is pivotally secured to the arms 52 and 54, as seen in the drawings. Although the drawings do not illustrate the same, there normally would be a plurality of spaced-apart arms 52 secured to the jack shaft 48 and there normally would be a plurality of spaced-apart arms 54 secured to the jack shaft 50. Similarly, there would be a second hydraulic cylinder, or a plurality of cylinders, corresponding to hydraulic cylinder 56.

Figures 11, 12:
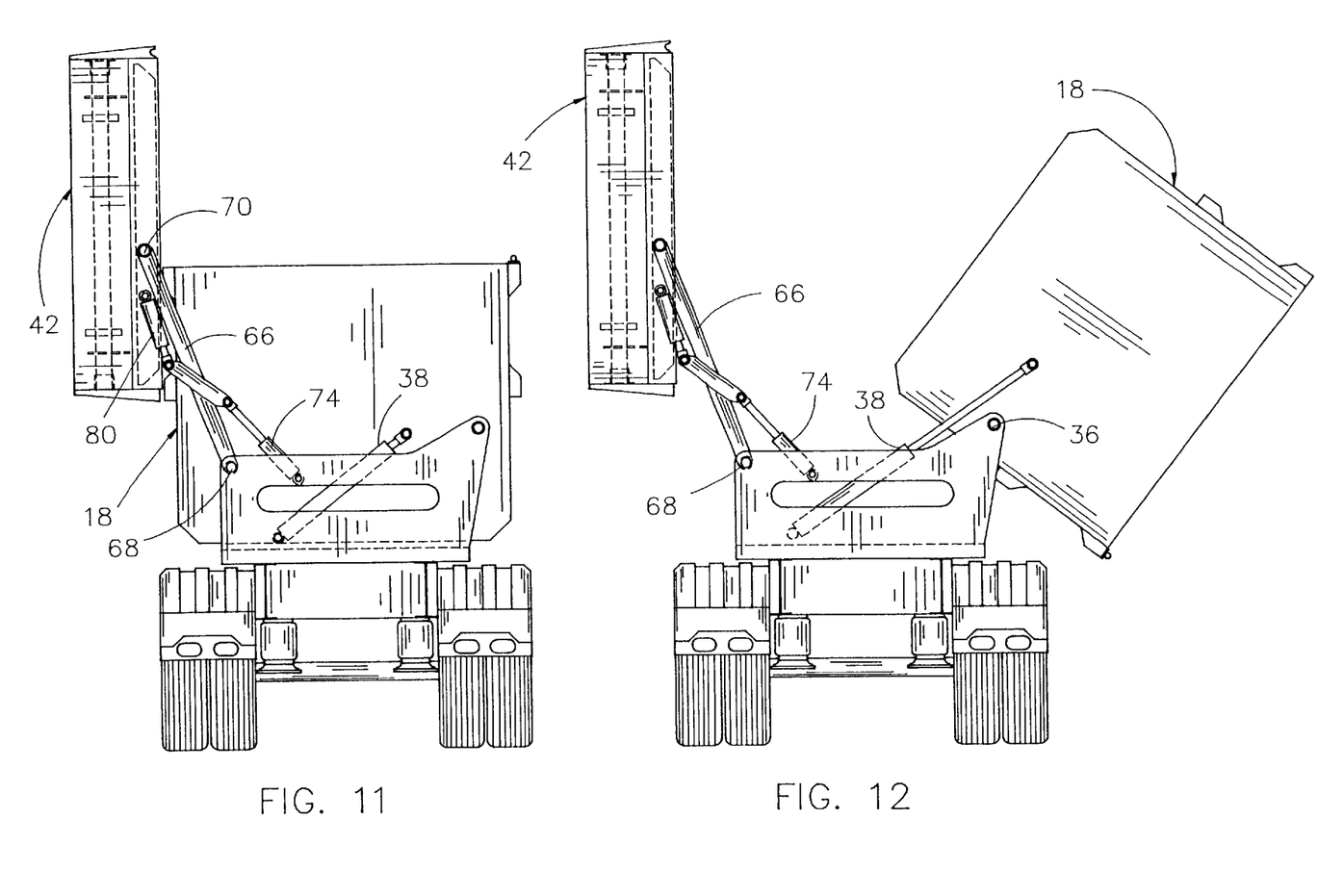
FIG. 11 is a view similar to FIG. 10 except that the compaction assembly has been moved to an inoperative position.
FIG. 12 is a view similar to FIG. 11 but which shows the side dump body having been pivoted to its dumping position.

A hydraulic cylinder 60 has its base end pivotally connected to the free end of the arm 52 and has its rod end pivotally connected to a generally rectangular-shaped material compaction member 62. A hydraulic cylinder 64 is pivotally connected at its base end to the free end of arm 54 and has its rod end pivotally connected to the material compaction member 62. If two arms 52 are utilized, a hydraulic cylinder 60 would be connected to each of the arms 52. Similarly, if two arms 54 are utilized, a pair of cylinders 64 would be connected to each of the arms 54. Means is provided at the forward and rearward ends of each of the bodies 18 for pivotally moving the material compaction assembly 42 from its operative or compaction position, wherein it overlies the upper end of the body 18, to the substantially vertically disposed position at one side of the body to enable the body 18 to pivotally move to its dumping position without interference from the material compaction assembly 42 (FIG. 11). Inasmuch as the means for pivoting the material compaction assembly 42 at each end of the body 18 is identical, only one of the pivot means will be described. An elongated arm 66 has its lower end pivotally secured to the support 32 at 68 and has its upper end pivotally connected to one end of the material compaction assembly 42 at 70. Bar 72 is rigidly fixed to arm 66, as seen in the drawings. Hydraulic cylinder 74 has one end thereof pivotally connected to support 32 at 76 and has its other end pivotally connected to one end of the bar 72 at 78. Hydraulic cylinder 80 has its rod end pivotally connected to one end of the bar 72 at 82 and has its base end pivotally connected to one end of the material compaction assembly 42 at 84.

Assuming that the material compaction assembly 42 is in its horizontally disposed position wherein it overlies the open upper end of the body 18, the material compaction assembly 42 is moved to its inoperative position as follows. Hydraulic cylinder 74 is initially extended somewhat which causes the arm 66 to pivotally move in a counterclockwise direction about pivot point 68 which causes the material compaction assembly 42 to be slightly raised upwardly from the upper end of the body 18. Once the material compaction assembly 42 has cleared the upper end of the body 18, hydraulic cylinder 74 is extended and hydraulic cylinder 80 is retracted which causes the material compaction assembly 42 to move to the substantially vertically disposed inoperative position at one side of the body 18. When the material compaction assembly 42 is in the inoperative position, the hydraulic cylinders 38 on the supports 32 and 32' may be extended so that the body 18 will be pivotally moved from its transport position to the dumping position, as illustrated in FIG. 12. When the material in the body 18 has been dumped laterally of the trailer, the hydraulic cylinders 38 are retracted to move the body 18 back to its transport position.

Figure 4:
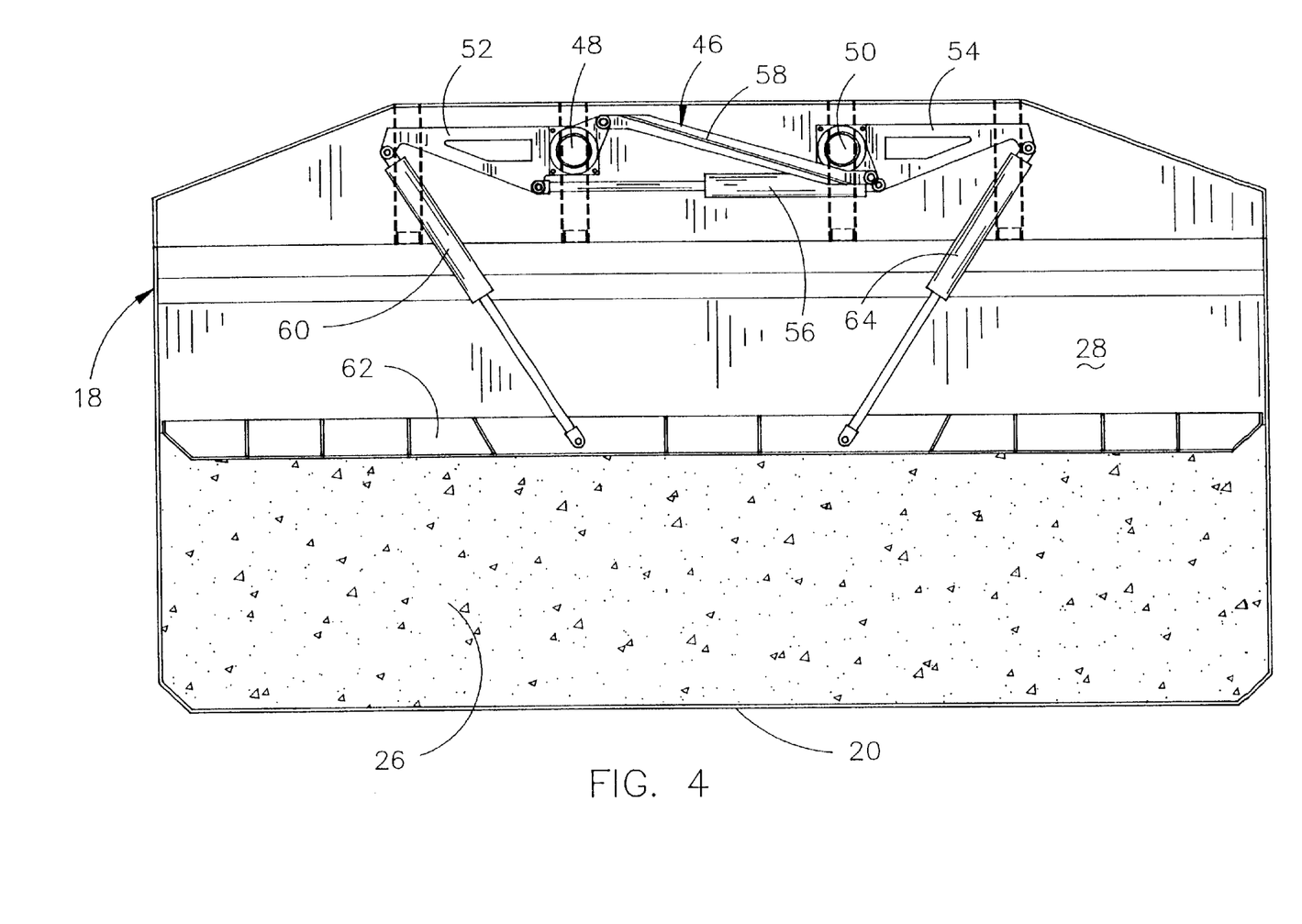
FIG. 4 is a side elevational view illustrating the compaction assembly being moved to its initial compaction position.
Figure 5:
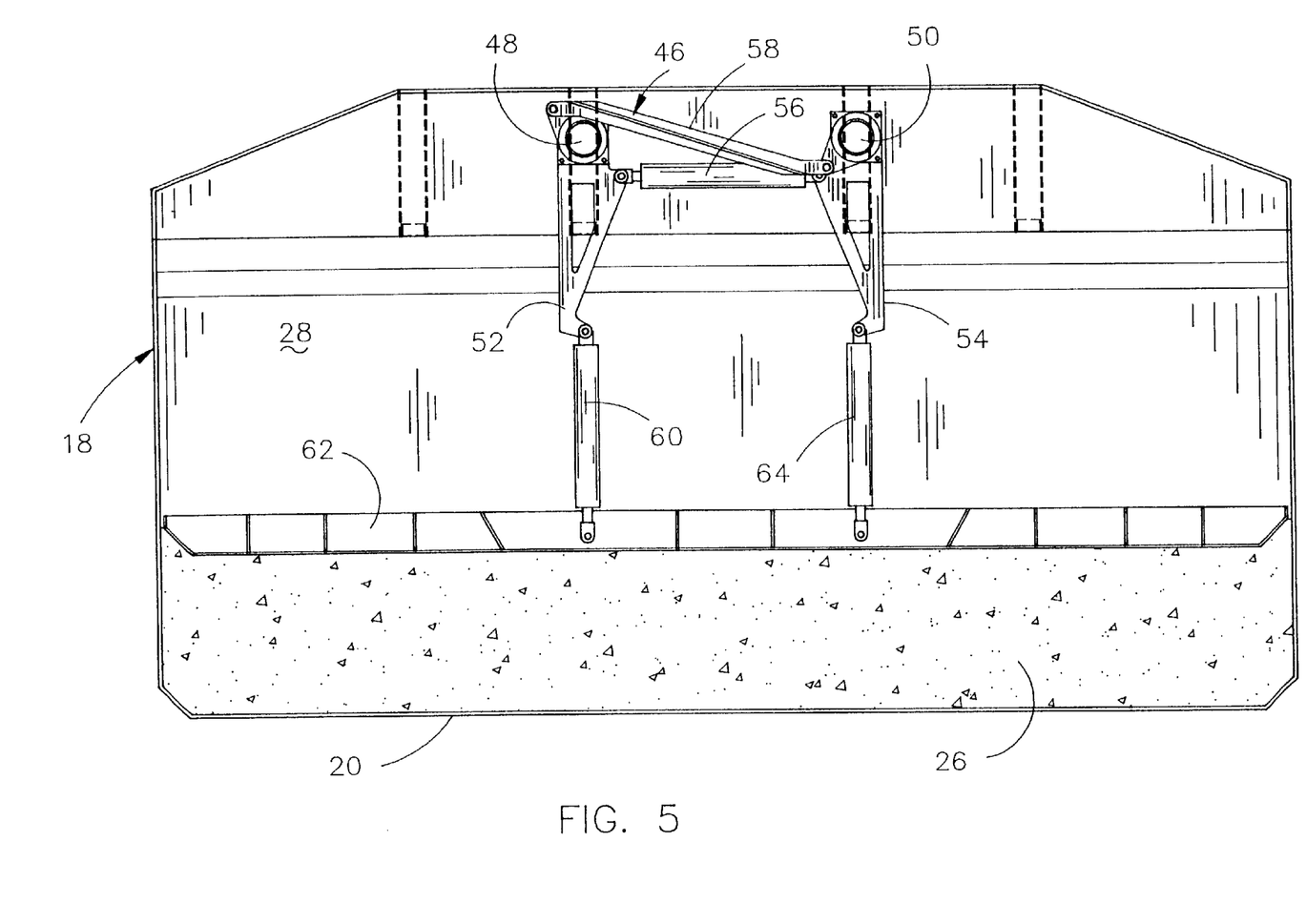
FIG. 5 is a view similar to FIG. 4 which illustrates the compaction assembly in a second position.
Figure 6:
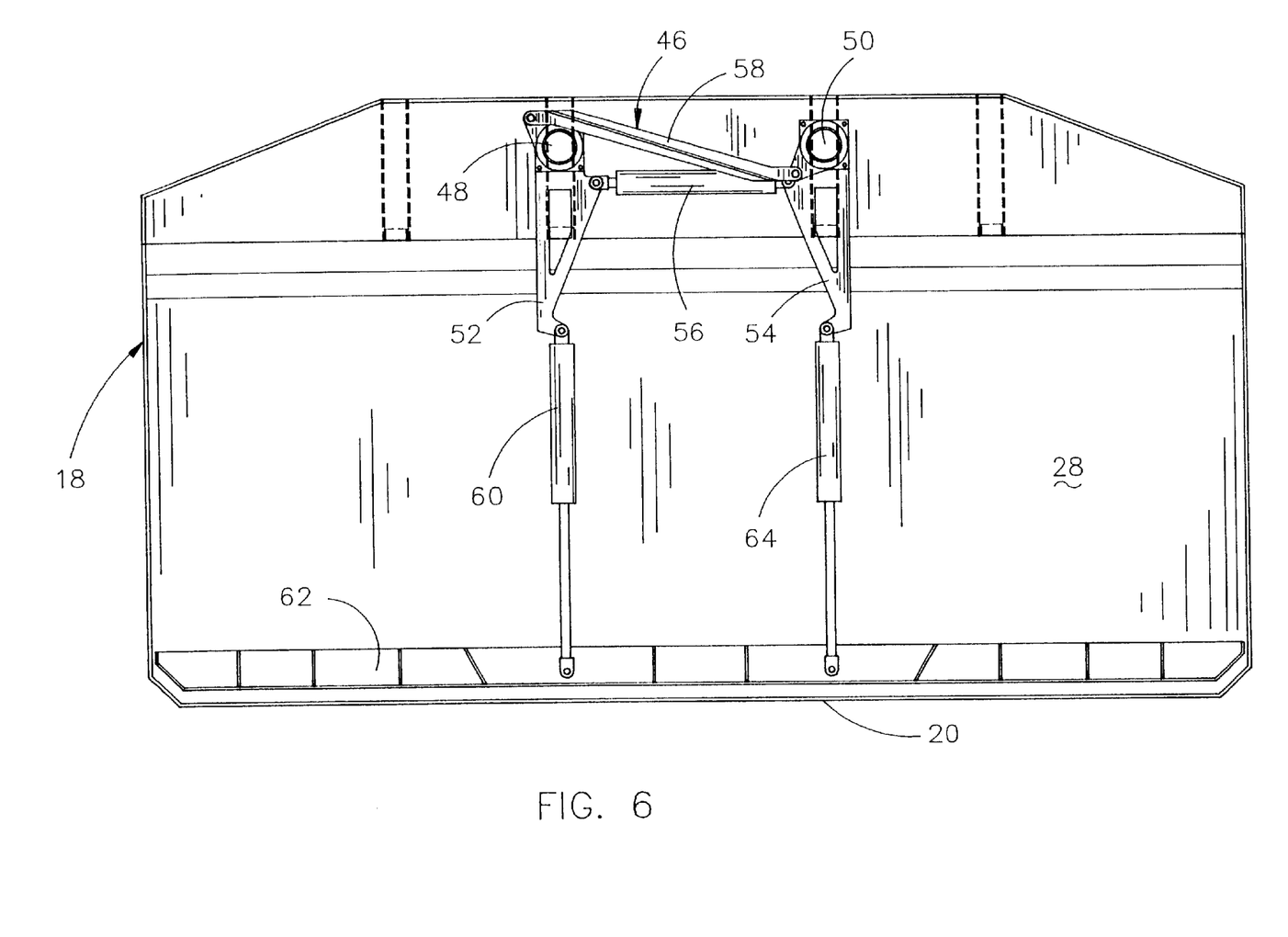
FIG. 6 is a view similar to FIGS. 4 and 5 except that the compaction assembly has been moved to its fully compacted position.
Figure 7:
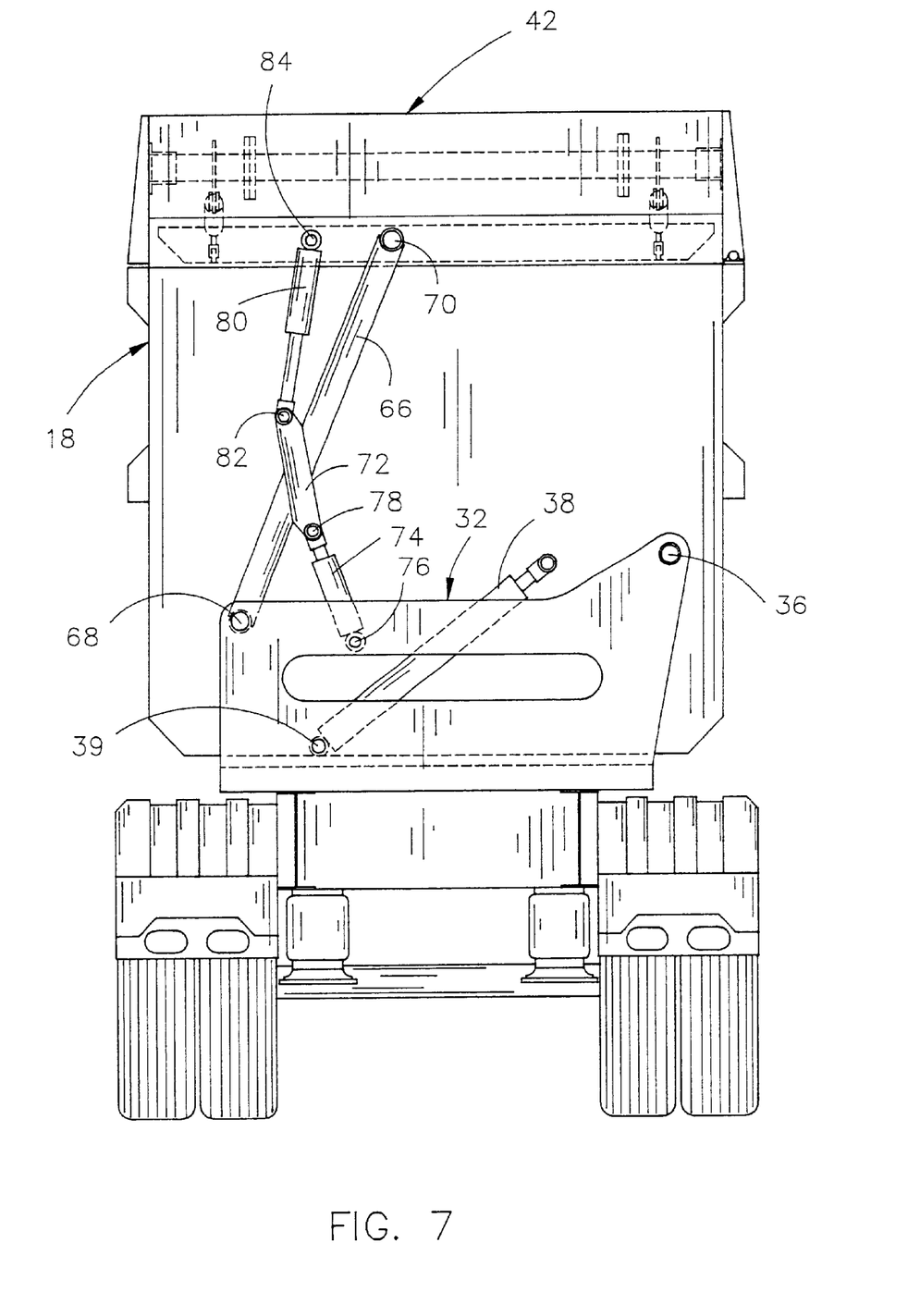
FIG. 7 is a rear elevational view of the invention.

Hydraulic cylinder 74 is then retracted while hydraulic cylinder 80 is extended to cause the material compaction assembly 42 to be pivotally moved from its vertically disposed inoperative position to its horizontally disposed operative or compaction position. Assuming that the body has been filled with material which is to be compacted, the hydraulic cylinders 60 and 64 are extended to cause the compaction member 62 to move from a position within the hood 44 (FIG. 2) to the position illustrated in FIG. 4 to initially compact the material therein. The hydraulic cylinders 60 and 64 are then retracted to raise the compaction member 62 to the position illustrated in FIG. 2. Hydraulic cylinder 56 is then retracted so that the free ends of the arms 52 and 54 pivotally move downwardly to the substantially vertically disposed position illustrated in FIG. 5. At that time, hydraulic cylinders 60 and 64 are again extended to cause the compaction member 62 to be moved downwardly to the position illustrated in FIG. 6 to further compact the material in the container or body.

When the material has been compacted, the compaction member 62 is moved upwardly into the interior of the hood 44 by retracting cylinders 60 and 64 and by extending cylinder 56 to enable the assembly 42 to again be pivotally moved to its inoperative position so that additional material may be deposited in the interior of the body for compaction. This procedure is repeated until the body is full of compacted material.

Although the compaction assembly is ideally suited for use with a side dump body, it could also be used with an end dump body, a walking floor body or a live bottom body. It should be noted that the compaction assembly, when in its inoperative position of FIG. 12, acts as a counterbalance during the dump cycle. Another advantage of this invention is that the compaction assembly secures the load in place during transport. Yet another advantage of this invention is that it is leak-proof.

Thus it can be seen that a novel side dump body having a material compaction assembly mounted thereon has been disclosed which accomplishes at least all of its stated objectives.

We claim:

1. In combination:
   a wheeled frame means having a rearward end, a forward end, and first and second sides;
   a side dump body movably positioned on said frame means and being pivotally movable from a transport position to a dumping position;
   means for moving said dump body between its transport position and dumping position;
   said dump body including a front wall, a back wall, a bottom wall, first and second side walls, and an open upper end;
   a material compaction assembly selectively movably positioned on said dump body which extends over said open upper end and which includes a material compaction member which is movable from a retracted position at said open upper end of said dump body downwardly to a compaction position in the interior of said dump body to compact the material therein;
   said material compaction assembly being substantially horizontal as said material compaction assembly moves from its retracted position to its compaction position;
   said material compaction assembly being movable from an operative position wherein it extends over said open upper end to an inoperative position to enable the pivotal movement of said dump body between its said transport and dumping positions without interference from said material compaction assembly.

2. The combination of claim 1 wherein a power cylinder means is provided in said material compaction assembly for moving said material compaction member between its said retracted and compaction positions.

3. The combination of claim 1 wherein said material compaction assembly, when in its said inoperative position, acts as a counterbalance for said dump body as said dump body moves from its said transport position to its said dumping position.

4. The combination of claim 1 wherein a plurality of side dump bodies are movably positioned on said frame means and wherein at least some of said dump bodies have a material compaction assembly positioned thereon.

5. The combination of claim 1 wherein said front wall, said back wall, and said first and second side walls are substantially vertically disposed.

6. The combination of claim 1 wherein said material compaction assembly is operatively pivotally mounted on said frame means.

7. The combination of claim 6 wherein said material compaction assembly is positioned at one side of said dump body when in its said inoperative position.

8. The combination of claim 7 wherein said material compaction assembly is substantially horizontally disposed when in its said operative position and is substantially vertically disposed when in its said inoperative position.

9. The combination of claim 8 wherein said dump body is pivotally moved towards said first side of said wheeled frame means when being moved to its said dumping position and wherein said material compaction assembly is moved towards said second side of said wheeled frame means when being moved from its said operative position to its said inoperative position.

10. The combination of claim 9 wherein said material compaction assembly is pivotally secured to said wheeled frame means and wherein a power cylinder means interconnects said material compaction assembly and said wheeled frame means for moving said material compaction assembly between its said operative and inoperative positions.

11. The combination of claim 1 wherein said material compaction assembly comprises a housing having an open lower end and a support frame positioned within said housing; said material compaction member being positioned within said housing when in its said retracted position; connection means connecting said support frame and said material compaction member; and means for moving said material compaction member with respect to said support frame and said dump body.

12. The combination of claim 11 wherein said means for moving said material compaction member comprises elongated first and second, horizontally disposed, rotatable jack shafts which have their longitudinal axes extending transversely with respect to the sides of said dump body; a first arm means having rearward and forward ends; a second arm means having rearward and forward ends; said first arm means being secured at its rearward end to said first jack shaft and extending forwardly therefrom; said second arm means being secured at its forward end to said second jack shaft and extending rearwardly therefrom; a first power cylinder means interconnecting the forward end of said first arm means to said material compaction member; a second power cylinder means interconnecting the rearward end of said second arm means to said material compaction member; and a third power cylinder means interconnecting said first and second arm means for pivotally moving said first and second arm means.

13. The combination of claim 12 wherein a link arm pivotally interconnects said first and second arm means.

14. The combination of claim 12 wherein said first power cylinder means comprises a plurality of power cylinders and wherein said second power cylinder means comprises a plurality of power cylinders.

15. The combination of claim 12 herein said third power cylinder means comprises a plurality of power cylinders.

16. The combination of claim 11 wherein said first arm means comprises a pair of spaced-apart arms and wherein said second arm means comprises a pair of spaced-apart arms.

17. In combination:
   a wheeled frame means having a rearward end, a forward end, and first and second sides;
   a body positioned on said frame means;
   said body including a front wall, a back wall, a bottom wall, first and second side walls, and an open upper end;
   and a material compaction assembly selectively movably positioned on said body which extends over said open upper end and which includes a material compaction member which is movable from a retracted position at said open upper end of said dump body downwardly to a compaction position in the interior of said dump body to compact the material therein;

said material: compaction assembly being substantially horizontal as said material compaction assembly moves from its retracted position to its compaction position.

18. The combination of claim 17 wherein said material compaction assembly is movable from an operative position wherein it extends over said open upper end to an inoperative position adjacent said body.

19. The combination of claim 18 wherein said material compaction assembly is operatively pivotally mounted on said frame means.

20. The combination of claim 18 wherein said material compaction assembly is positioned at one side of said body when in its said inoperative position.

21. In combination:
a wheeled frame means having a rearward end, a forward end, and first and second sides;
a side dump body movably positioned on said frame means and being pivotally movable from a transport position to a dumping position;
means for moving said dump body between its transport position and dumping position;
said dump body including a front wall, a back wall, a bottom wall, first and second side walls, and an open upper end;
a material compaction assembly selectively movably positioned on said dump body which extends over said open upper end and which includes a material compaction member which is movable from a retracted position at said open upper end of said dump body downwardly to a compaction position in the interior of said dump body to compact the material therein;
said material compaction assembly being movable from an operative position wherein it extends over said open upper end to an inoperative position to enable the pivotal movement of said dump body between its said transport and dumping positions without interference from said material compaction assembly;
said material compaction assembly comprising a housing having an open lower end and a support frame positioned within said housing; said material compaction member being positioned within said housing when in its said retracted position; connection means connecting said support frame and said material compaction member; and means for moving said material compaction member with respect to said support frame and said dump body.

22. The combination of claim 21 wherein said means for moving said material compaction member comprises elongated first and second, horizontally disposed, rotatable jack shafts which have their longitudinal axes extending transversely with respect to the sides of said dump body; a first arm means having rearward and forward ends; a second arm means having rearward and forward ends; said first arm means being secured at its rearward end to said first jack shaft and extending forwardly therefrom; said second arm means being secured at its forward end to said second jack shaft and extending rearwardly therefrom; a first power cylinder means interconnecting the forward end of said first arm means to said material compaction member; a second power cylinder means interconnecting the rearward end of said second arm means to said material compaction member; and a third power cylinder means interconnecting said first and second arm means for pivotally moving said first and second arm means.

23. The combination of claim 22 wherein a link arm pivotally interconnects said first and second arm means.

24. The combination of claim 22 wherein said first power cylinder means comprises a plurality of power cylinders and wherein said second power cylinder means comprises a plurality of power cylinders.

25. The combination of claim 22 wherein said third power cylinder means comprises a plurality of power cylinders.

26. The combination of claim 22 wherein said first arm means comprises a pair of spaced-apart arms and wherein said second arm means comprises a pair of spaced-apart arms.

* * * * *